(12) United States Patent
Goto et al.

(10) Patent No.: US 6,552,456 B2
(45) Date of Patent: Apr. 22, 2003

(54) HYDRAULIC DYNAMIC PRESSURE BEARING MOTOR

(75) Inventors: Hiromitsu Goto, Chiba (JP); Shinji Kinoshita, Chiba (JP); Toru Kumagai, Chiba (JP); Yukihiro Nakayama, Chiba (JP); Chihiro Tazawa, Chiba (JP); Mitsuharu Iwamoto, Chiba (JP); Ryoji Yoneyama, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/996,830

(22) Filed: Nov. 29, 2001

(65) Prior Publication Data

US 2002/0093261 A1 Jul. 18, 2002

(30) Foreign Application Priority Data

Nov. 30, 2000 (JP) ........................... 2000-365595
Nov. 28, 2001 (JP) ........................... 2001-362905

(51) Int. Cl.$^7$ .............................. H02K 7/08; F16C 32/06
(52) U.S. Cl. ................. 310/90; 360/99.08; 369/269; 384/107
(58) Field of Search .................... 310/90, 90.5, 91; 384/107, 121, 123, 114, 112; 360/99.04, 99.08, 99.07; 369/266, 269

(56) References Cited

U.S. PATENT DOCUMENTS

| | | | | |
|---|---|---|---|---|
| 5,223,758 A | * | 6/1993 | Kataoka et al. | 310/67 R |
| 6,316,856 B1 | * | 11/2001 | Kusaki et al. | 310/90 |
| 6,340,854 B1 | * | 1/2002 | Jeong | 310/90 |
| 6,354,742 B1 | * | 3/2002 | Iwaki et al. | 384/107 |
| 6,369,981 B2 | * | 4/2002 | Nii et al. | 360/99.08 |
| 6,390,681 B1 | * | 5/2002 | Nakazeki et al. | 384/107 |
| 6,412,984 B2 | * | 7/2002 | Asai et al. | 384/107 |
| 6,431,757 B1 | * | 8/2002 | Nakazeki et al. | 384/107 |
| 6,456,458 B1 | * | 9/2002 | Ichiyama | 360/99.08 |

FOREIGN PATENT DOCUMENTS

JP 08-321131 * 3/1996

OTHER PUBLICATIONS

Koseki et al., May 2, 20002, U.S. patent application Publication, US 20020051588A1.*
Mori et al., May 2, 20002, U.S. patent application Publication, US 20020051588A1.*

* cited by examiner

Primary Examiner—Thomas M. Dougherty
Assistant Examiner—J. Aguirrechea
(74) Attorney, Agent, or Firm—Adams & Wilks

(57) ABSTRACT

A hydraulic dynamic pressure bearing motor has a rotational shaft mounted to undergo rotation about a rotational axis and having a shaft section and a flange section. A sleeve has a cavity for receiving the rotational shaft. A cover member is disposed over an open end of the sleeve cavity. A hydraulic dynamic pressure bearing includes minute radial and thrust clearances disposed between outer surface portions of the shaft and flange sections of the rotational shaft and inner surface portions of the sleeve and the cover member. A lubricating fluid is disposed in the minute radial and thrust clearances. The minute radial and thrust clearances are dimensioned so that during a non-rotational state of the rotational shaft, the flange section of the rotational shaft contacts preselected inner surface portions of the sleeve and the cover member while the shaft section of the rotational shaft does not contact any portion of the sleeve and an inner peripheral surface of the cover member.

17 Claims, 3 Drawing Sheets

HYDRAULIC DYNAMIC PRESSURE BEARING MOTOR

BACKGROUND OF THE INVENTION

1. Field of the Invention

The present invention relates to a hydraulic dynamic pressure bearing motor for a thin HDD device, and particularly to a hydraulic dynamic pressure bearing motor suited for a driving source of a body of rotation or a small and thin HDD device for a magnetic disk with a diameter of 2.5 in. or less.

2. Description of the Related Art

FIG. 1 is a cross sectional view showing a hydraulic dynamic pressure bearing motor in the related art disclosed in JP-A-8-321131. Namely, in FIG. 1, there is disclosed a hydraulic dynamic pressure bearing motor and an HDD device employing the hydraulic dynamic pressure bearing motor as a driving source. The hydraulic dynamic pressure bearing motor comprises a rotor, a stator, and a hydraulic dynamic pressure bearing supporting the rotor on the stator. The rotor includes a rotor magnet 12 and has a rotary shaft 15 and a hub 16 fixed to the rotary shaft 15 at one end thereof with axes of the rotary shaft 15 and the hub 16 being on the same axis. On the hub 16, there are mounted one or a plurality of magnetic disks 1 in stacked relation and spaced-apart from one another by spacers 13. The stator includes a base plate 7 and a stator coil 11 producing a turning force by an interactive electromagnetic action with the rotor magnet 12. Also shown in FIG. 1 are a cover 8, a flange 9, a bearing 10, a seal 14, a clamp 17, and a housing 19 of the hydraulic dynamic pressure bearing motor.

The hydraulic dynamic pressure bearing used in the above hydraulic dynamic pressure bearing motor in the related art comprises as bearing components the rotary shaft 15, a sleeve (bearing) 10 into which the rotary shaft is rotatably inserted, and an upper thrust bearing member 18 fixed on the rotary shaft 15, and lubricating fluid filling minute clearances formed by the above bearing components. Of the minute clearances, a radial clearance between an outer peripheral surface of the rotary shaft 15 and an inner peripheral surface of the sleeve (bearing) 10 constitutes together with the outer peripheral surface of the rotary shaft 15 and the inner peripheral surface of the sleeve 10 a radial bearing section of the hydraulic dynamic pressure bearing. On one of the outer peripheral surface of the rotary shaft 15 and the inner peripheral surface of the sleeve (bearing) 10 constituting the radial bearing section, there are formed herringbone type radial dynamic pressure generating grooves. Moreover, on one of the bottom surface of the upper thrust bearing member 18 and the upper end face of the sleeve (bearing) 10, there are formed spirally grooved thrust dynamic pressure generating grooves.

In the hydraulic dynamic pressure bearing motor in the related art, as shown in FIG. 2. a clearance in the radial direction between the rotary shaft 15 and the sleeve (bearing) 10, i.e. a radial clearance $\delta$ ($\mu$m), is determined so that six times the clearance $\delta$ does not exceed a value of $(1/d)\times\Delta$, the product of a ratio $(1/d)$ and a minimum clearance $\Delta$ in the axial direction between the magnetic disk and a head loading arm 6, where d is the radius of the magnetic disk (mm) 1 and 1 is the bearing length (mm) in the axial direction, respectively. Furthermore, in FIG. 2, W and S represent inclination and eccentricity of the magnetic disk 1 at the rim thereof, respectively.

By the foregoing construction as shown in FIG. 3, even when no bearing stiffness is provided for the hydraulic dynamic pressure bearing motor at rest, the magnetic disk 1 can be kept so as not to contact with a head supporting system such as a head loading arm 6. Stated otherwise, although the rotary shaft at rest is inclined within a range of the radial clearance $\delta$ of the radial bearing section, the radial clearance $\delta$ is determined so that the magnetic disk 1 never contacts with the head loading arm even with the maximum inclination of the rotary shaft. This has allowed an increase in the number of stacked magnetic disks to realize an HDD device with a large capacity.

Incidentally, in recent years, an HDD device has been highly regarded as the most excellent storage medium mounted in an information home appliance. This is due to evaluation of a number of superior features of the hydraulic dynamic pressure bearing to a rolling bearing, in particular to a feature of considerably softened noise. A large amount of dynamic image information to be processed in the information home appliance requires an HDD device in the information home appliance to be provided with a high storage density.

Accordingly, the applicant also has been engaged in, developing a compact and thin hydraulic dynamic pressure bearing motor used for a small size HDD device on which there are mounted magnetic disks with a diameter of 2.5 in. or less. The thinned hydraulic dynamic pressure bearing, however, caused the length of a bearing section to be shortened which determines the inclination of the rotary shaft. This resulted in a problem in which the relation disclosed in the above JP-A-8-321131 could not be satisfied. Namely, the relation could not satisfied in which six times the clearance $\Delta$ does not exceed a value of $(1/d)\times\Delta$, the product of $(1/d)$, a ratio of the bearing length l in the axial direction to the radius d of the magnetic disk 1, and a minimum clearance $\Delta$ in the axial direction between the magnetic disk and a head loading arm. Hence, a structural problem occurred in which, when the rotary shaft at rest is inclined within a range of the radial clearance $\Delta$ of the radial bearing section, the magnetic disk 1 is brought to be in contact with the head loading arm to damage the disk or the head.

Accordingly, it is an object of the present invention to solve the above problem and to provide a compact and thin hydraulic dynamic pressure bearing motor used for an HDD device which is provided with a thin hydraulic dynamic pressure bearing being constituted by comprising a flanged rotary shaft having a shaft section and a flange section, a sleeve into which the flanged rotary shaft is rotatably inserted, and lubricating fluid filling minute clearances formed by bearing components including the above flanged rotary shaft and the sleeve, in which, even when no bearing stiffness is provided for the hydraulic dynamic pressure bearing motor at rest, the magnetic disk is made so as not to contact with a head supporting system such as a head loading arm.

SUMMARY OF THE INVENTION

In order to solve the above problem, in a compact and thin hydraulic dynamic pressure bearing motor used for an HDD device which motor is provided with a thin hydraulic dynamic pressure bearing being constituted by comprising a rotary shaft, a sleeve into which the rotary shaft is rotatably inserted, a thrust member fixed to the rotary shaft, and lubricating fluid filling minute clearances formed by those bearing components, a diameter of the thrust member and the minute clearance are determined so that the rotary shaft at rest is inclined within a range of the minute clearance without making the magnetic disk contact with a head and components constituting a head supporting system.

Namely, in order to solve the above problem, in a hydraulic dynamic pressure bearing motor comprising a rotor with a hub mounting a magnetic disk thereon being fixed to a rotary shaft at one end thereof with an axis of the hub and the axis of the rotary shaft being on the same axis, a stator generating a force for rotating the rotor by an interactive electromagnetic action between the rotor and the stator, and a hydraulic dynamic pressure bearing supporting the rotor on the stator, the hydraulic dynamic pressure bearing is employed which is constituted by comprising as prime bearing components a flanged rotary shaft having a shaft section and a flange section, and a sleeve into which the flanged rotary shaft is rotatably inserted, the bearing components forming between them a plurality of minute clearances comprising a radial clearance and a thrust clearance, the flanged rotary shaft that forms the radial clearance being provided with thereon radial dynamic pressure generating grooves, the flanged rotary shaft that forms the thrust clearance being provided with thereon thrust dynamic pressure generating grooves, and a plurality of the minute clearances being filled with lubricating fluid. A diameter of the flange section of the flanged rotary shaft and the thrust clearance are determined so that the flanged rotary shaft at rest is inclined within a range of the thrust clearance without making the magnetic disk contact with a head and components constituting a head supporting system.

More specifically, the thrust clearance c was determined as being equal to or less than a value for which a product md of a maximum vertical shift m at a rim of the magnetic disk and a diameter d of the flange section of the flanged rotary shaft is divided by 4r, four times a radius r of the magnetic disk.

Moreover, in the hydraulic dynamic pressure bearing motor according to the present invention, the hydraulic dynamic pressure bearing, in which the diameter of the flanged rotary shaft and the thrust clearance are determined as above, is a hydraulic dynamic pressure bearing in which the radial dynamic pressure generating grooves are formed on an outer peripheral surface of the flange section, and the thrust dynamic pressure generating grooves are formed on both of upper and lower radial surfaces of the flange section. Alternatively, in the hydraulic dynamic pressure bearing of the present invention, the radial dynamic pressure generating grooves are formed on an outer peripheral surface of the shaft section, and the thrust dynamic pressure generating grooves are formed on both of upper and lower radial surfaces of the flange section.

DETAILED DESCRIPTION OF THE PREFERRED EMBODIMENT

Figure 4:
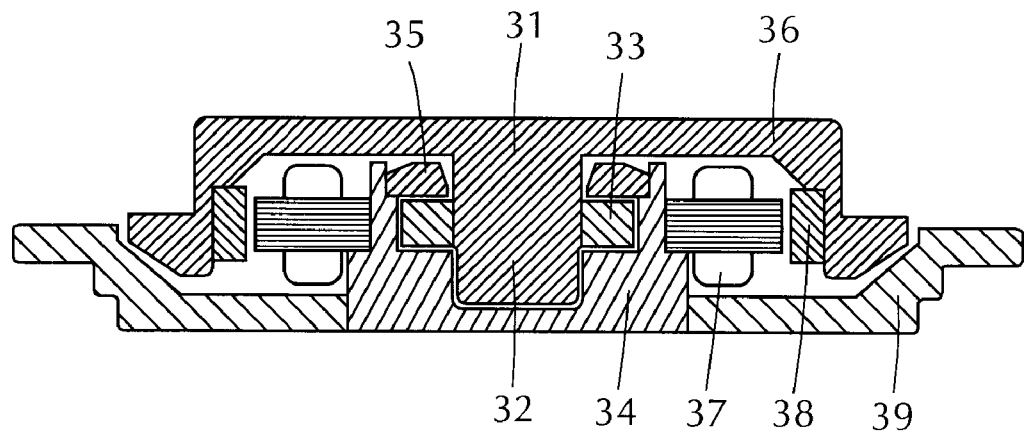
FIG. 4 is a cross sectional view showing an embodiment of a hydraulic dynamic pressure bearing motor to which the present invention is applied.

FIG. 4 is a cross sectional view showing an embodiment of a compact and thin hydraulic dynamic pressure bearing motor in which a rotor is rotatably supported on a stator by means of a later described hydraulic dynamic pressure bearing shown in FIG. 5. The rotor includes a cup-like hub 36 on which a magnetic disk is mounted and a rotor magnet 38 mounted on an inner peripheral surface of a skirt section of the cup-like hub 36. The stator includes a base plate 39, a sleeve 34 of the hydraulic dynamic pressure bearing secured to the base plate 39, and a stator coil 37 mounted on an outer peripheral surface of the sleeve 34. Moreover, the rotor is fixed to a flanged rotary shaft 31 with the cup-like hub 36 with the axis of the hub 36 and the axis of the flanged rotary shaft 31 being on the same axis. The compact and thin hydraulic dynamic pressure bearing motor is rotated by an interactive electromagnetic action between the stator coil 37 and the rotor magnet 38.

Figure 5:
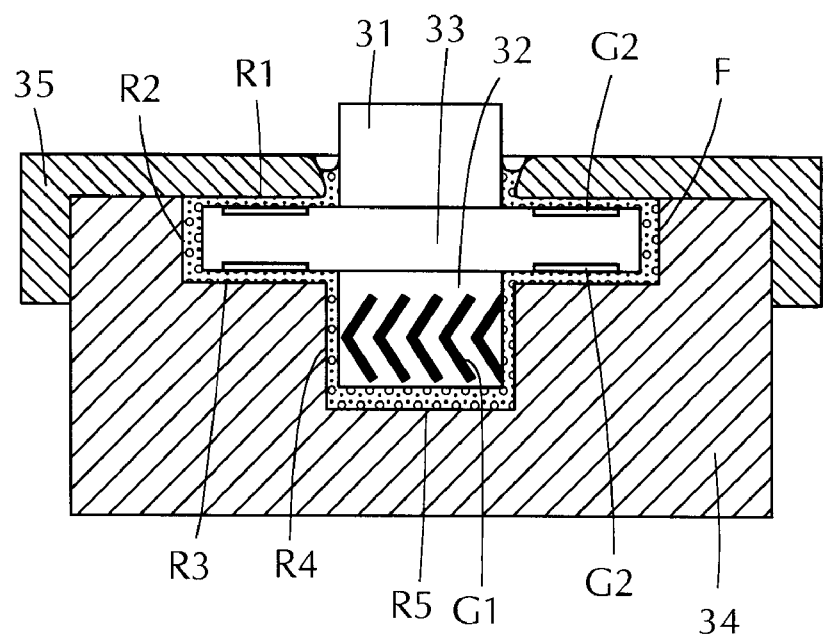
FIG. 5 is a cross sectional view showing an example of a compact and thin hydraulic dynamic pressure bearing to which the present invention is applied with minute clearances shown in being exaggerated.
Figure 6:
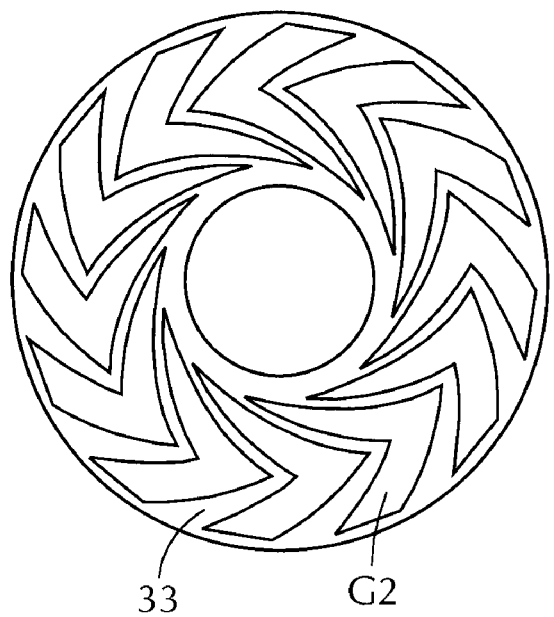
FIG. 6 is a plan view showing an example of a thrust dynamic pressure generating grooves.

FIG. 5 is a cross sectional view showing an example of a hydraulic dynamic pressure bearing adopted to the above compact and thin hydraulic dynamic pressure bearing motor, in which minute clearances are drawn in being exaggerated. The hydraulic dynamic pressure bearing shown in FIG. 5 comprises the flanged rotary shaft 31 comprising a ring section 33 and a cylindrical section 32, the sleeve 34 receiving the flanged shaft 31, and a ring-like lid 35 also functioning as a thrust hold-down member. On the upper surface and the lower surface of the ring section 33, there are formed spiral thrust dynamic pressure generating grooves G2 such as herringbone grooves. Moreover, on the outer peripheral surface of the ring section 33, there are formed radial dynamic pressure generating grooves G1 such as herringbone grooves. Furthermore, minute clearances R1, R2, R3, R4 and R5 formed between the bearing components are filled with lubricating oil F. Each of the minute clearances R1 and R3 are called as a thrust clearance. In FIG. 6, there is shown a plan view of an example of a thrust dynamic pressure generating grooves G2.

Figure 7:
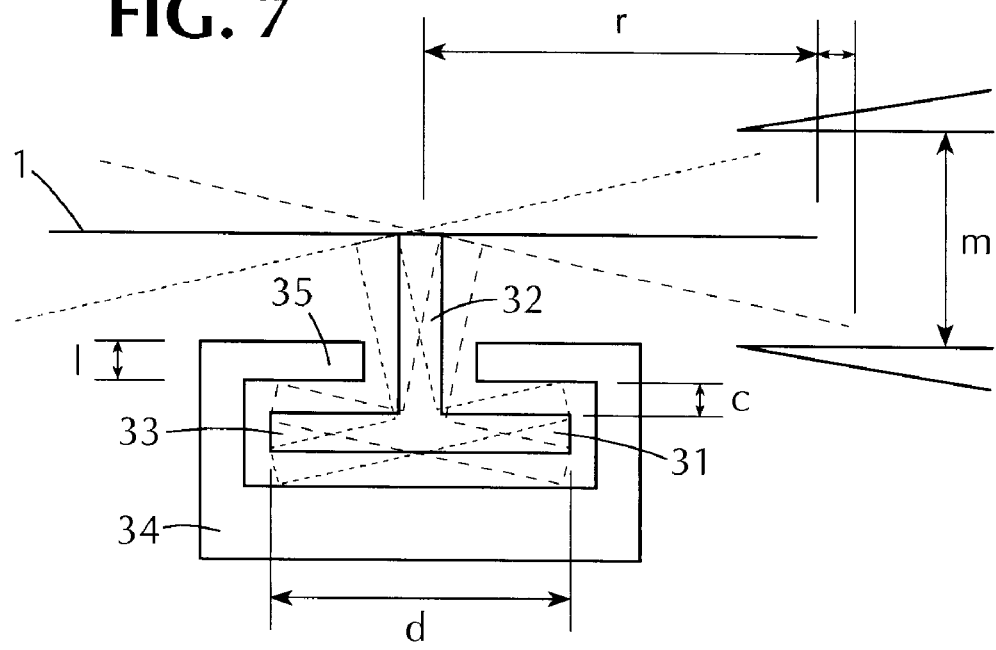
FIG. 7 is an explanatory diagram showing a geometrical relation among bearing components, a magnetic disk and a head supporting member in the hydraulic dynamic pressure bearing motor according to the present invention when a flanged rotary shaft at rest is in maximum rightward or leftward inclination.

FIG. 7 is an explanatory diagram showing a geometrical relation among bearing components, a magnetic disk and a head supporting member with minute clearances drawn in being exaggerated. The diagram is for explaining how a diameter of the ring section (flange) 33 of the flanged rotary shaft 31 and the thrust clearance are determined so that the flanged rotary shaft 31 at rest is inclined within a range of the thrust clearance without making the magnetic disk 1 contact with a head and components constituting a head supporting system.

In FIG. 7, the flanged rotary shaft 31 is shown as an inverted T type member comprising the shaft (cylindrical section) 32 and the flange (ring section) 33, The sleeve 34 is shown as an opened-box-like member with a rectangular cross section in one piece with the ring-like lid 35.

Also in FIG. 7, characters c, m, d and r represent the thrust clearance, the maximum vertical shift at a rim of the magnetic disk, a diameter of the flange 33 of the flanged rotary shaft 31, and a radius of the magnetic disk, respectively. Although the thrust clearance c is defined as a clearance between the radial surface on the upper side of the flange 33 and the lower surface of the ring-like lid 35, the real so exists a similar clearance c between the radial surface on the lower side of the flange 33 and the bottom surface of the sleeve 34. Moreover, the maximum vertical shift m at the rim of the magnetic disk is a distance between a horizontal position of the rim for the maximum rightward inclination of the flanged rotary shaft 31 and a horizontal position of the rim for the maximum leftward inclination of the shaft 31.

The flanged rotary shaft 31 in the maximum rightward inclination is shown by a thick broken line. In this case, the flanged rotary shaft 31 abuts the lower surface of the ring-like lid 35 with the upper left-hand edge, with the lower right-hand edge abutting the bottom surface of the sleeve 34. The flanged rotary shaft 31 in the maximum leftward inclination is shown by a thin dotted line. In this case, the flanged rotary shat 31 abuts the lower surface of the ring-like lid 35 with the upper right-hand edge, with the lower left-hand edge abutting the bottom surface of the sleeve 34. In each case, there is no contact of the shaft 32 of the flanged rotary shaft 31 with not only the sleeve 34, of course, but also an inner peripheral surface of a shaft insertion opening of the ring-like lid 35. That is, in the present invention, the flanged rotary shaft 31 can incline only within a range allowing the flange 33 to incline in the sleeve 34, Thus, as is apparent with reference to FIG. 7, an expression holds between the inclined flange 33 and the inclined magnetic disk 1 as, $d/2:c=r:m/2$. That is, an expression holds as $c=md/4r$. Therefore, when an expression $c<(md/4r)$ holds, the magnetic disk 1 at rest does not contact with the head or components constituting the head supporting system Hence, in the present invention, the thrust clearance c is determined as being less than the value for which a product md of the maximum vertical shift m at the rim of the magnetic disk 1 and the diameter d of the flange 33 of the flanged rotary shaft 31 is divided by four times the radius r of the magnetic disk 1.

Figure 1:
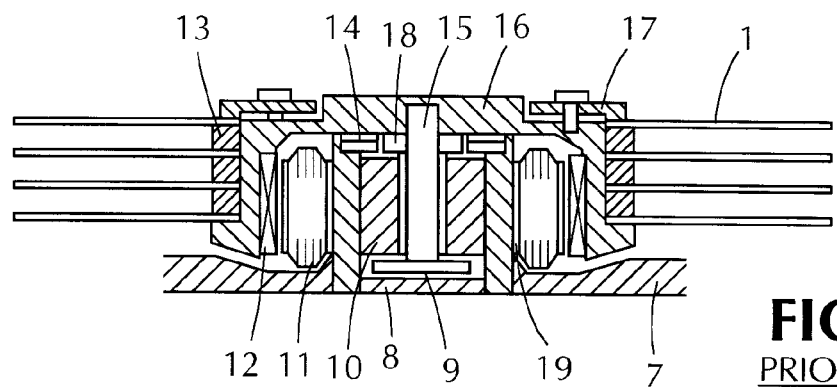
FIG. 1 is a cross sectional view showing a hydraulic dynamic pressure bearing motor in the related art.
Figure 2:
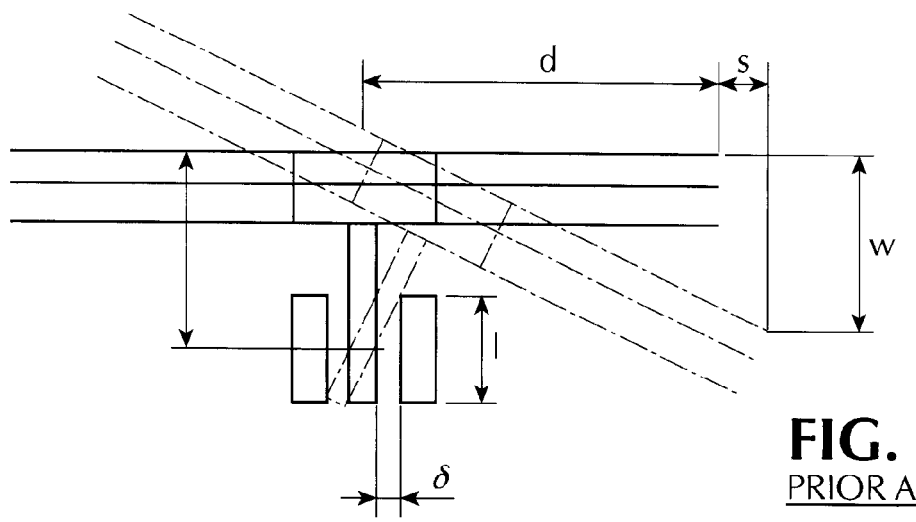
FIG. 2 is an explanatory diagram showing a geometrical relation among bearing components, a magnetic disk and a head supporting member in the hydraulic dynamic pressure bearing motor in the related art shown in FIG. 1 when a shaft at rest is in maximum rightward inclination.
Figure 3:
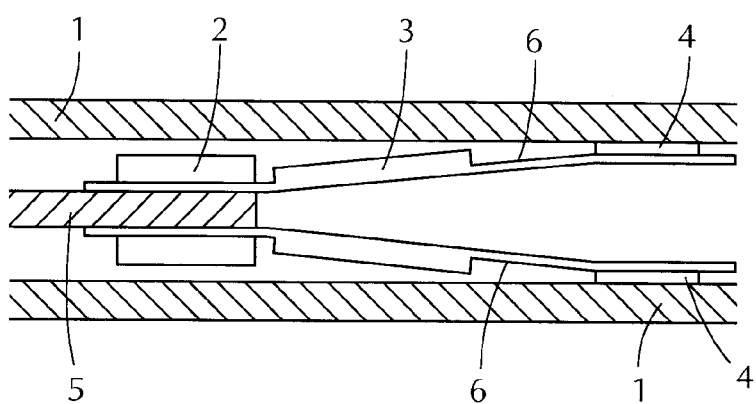
FIG. 3 is an explanatory view showing a structure around magnetic disks.

In the foregoing, the workings of the present invention was explained with reference to FIG. 7 that shows the flanged rotary shaft 31 of the inverted T type and the opened-box-like sleeve 34 with a rectangular cross section in one piece with the ring-like lid 35. The bearing component of the hydraulic dynamic pressure bearing motor according to the present invention, however, is not limited to the flanged rotary shaft 31 of the inverted T type. The present invention can be of course applied also to hydraulic dynamic pressure bearing-motors having flanged rotary shafts with respective flanges formed mid sections of the shafts as bearing components as shown in FIG. 1 and FIG. 2. In short, the present invention can be applied to all of the hydraulic dynamic pressure bearing motors having structures in each of which inclination of a flanged shaft is limited by a thrust clearance rather than by a radial clearance. Furthermore, the present invention can be applied both to a type in which a magnetic disk is secured to a flanged rotary shaft or a hub and to a type in which a magnetic disk is detachably mounted (removable type), on which both single disk and a plurality of disks can be mounted.

As described above, the present invention provides compact and thin hydraulic dynamic pressure bearing motor, in which the magnetic disk does not contact with a head supporting system, such as a head loading arm, to cause no damage on the disk or the head even when no bearing stiffness is provided for the hydraulic dynamic pressure bearing motor at rest, and in particular, a hydraulic dynamic pressure bearing motor suited for a driving source of a body of rotation of an HDD device for a magnetic disk with a diameter of 2.5 in. or less.

What is claimed is:

1. A hydraulic dynamic pressure bearing motor comprising:
   a rotational shaft mounted to undergo rotation about a rotational axis, the rotational shaft having a shaft section and a flange section;
   a rotor having a hub for supporting a rotational member thereon and connected to the rotational shaft for rotation therewith about the rotational axis;
   a stator for generating a force to rotate the rotor by an interactive electromagnetic action between the rotor and the stator;
   a sleeve having a cavity for receiving the rotational shaft so that a preselected portion of the shaft section extends out of the cavity through an open end thereof;
   a cover member disposed over the open end of the sleeve cavity and having a through-hole through which the preselected portion of the shaft section of the rotational shaft extends when the rotational shaft is disposed in the cavity of the sleeve, the through-hole having an inner peripheral surface and a diameter greater than a diameter of the preselected portion of the shaft section; and
   a hydraulic dynamic pressure bearing disposed between the rotor and the stator and comprised of outer surface portions of the shaft section and the flange section of the rotational shaft, inner surface portions of the sleeve and the cover member, a plurality of minute radial and thrust clearances disposed between the outer surface portions of the shaft and flange sections of the rotational shaft and the inner surface portions of the sleeve and the cover member, and a lubricating fluid disposed in the minute radial and thrust clearances, the minute radial and thrust clearances being dimensioned so that during a non-rotational state of the rotational shaft, the flange section of the rotational shaft contacts preselected inner surface portions of the sleeve and the cover member while the shaft section of the rotational shaft does not contact any portion of the sleeve and the inner peripheral surface of the cover member.

2. A hydraulic dynamic pressure bearing motor according to claim 1; wherein the dimension of each of the thrust clearances is equal to or less than a value obtained by the product of a maximum vertical shift of the rotational member during a non-rotational state of the rotational shaft and a diameter of the flange section of the rotational shaft divided by four times a radius of the rotational member.

3. A hydraulic dynamic pressure bearing motor according to claim 2; wherein the rotational member comprises a magnetic disk.

4. A hydraulic dynamic pressure bearing motor according to claim 1; further comprising a plurality of radial dynamic pressure generating grooves and a plurality of thrust dynamic pressure generating grooves formed on the rotational shaft.

5. A hydraulic dynamic pressure bearing motor according to claim 4; wherein the radial dynamic pressure generating grooves are formed on an outer peripheral surface of the shaft section of the rotational shaft; and wherein the thrust dynamic pressure generating grooves are formed on both of upper and lower radial surfaces of the flange section of the rotational shaft.

6. A hydraulic dynamic pressure bearing motor according to claim 5; wherein the rotational member comprises a magnetic disk.

7. A hydraulic dynamic pressure bearing motor according to claim 4; wherein the radial dynamic pressure generating grooves are formed on an outer peripheral surface of the flange section of the rotational shaft; and wherein the thrust dynamic pressure generating grooves are formed on both of upper and lower radial surfaces of the flange section of the rotational shaft.

8. A hydraulic dynamic pressure bearing motor according to claim 7; wherein the rotational member comprises a magnetic disk.

9. A hydraulic dynamic pressure bearing motor according to claim 1; wherein the rotational member comprises a magnetic disk.

10. A hydraulic dynamic pressure bearing motor comprising:
   a base member;
   a sleeve connected to the base member and having a cavity;
   a cover member disposed over the sleeve cavity and having a through-hole disposed in communication with an open end of the cavity;
   a rotational shaft mounted to undergo rotation about a rotational axis relative to the sleeve and having a first section and a second section, the first section being disposed in the cavity of the sleeve to define a plurality of minute radial clearances between outer surface portions of the first section and inner surface portions of the cavity and the cover member, and the second section having a first portion extending from the open end of the cavity and the through-hole of the cover member and a second portion, the second portion of the second section being disposed in the cavity to define a plurality of minute thrust clearances between an outer surface of the second portion and inner surface portions of the cavity, the minute radial and thrust clearances being dimensioned so that during a non-rotational state of the rotational shaft, the first section of the rotational shaft contacts preselected inner surface portions of the sleeve and the cover member while the second section of the rotational shaft does not contact any portion of the sleeve and cover member;
   a lubricating fluid disposed in the minute radial and thrust clearances;
   a rotor connected to the rotational shaft for rotation therewith about the rotational axis; and
   a stator for generating a force to rotate the rotor by an interactive electromagnetic action between the rotor and the stator.

11. A hydraulic dynamic pressure bearing motor according to claim 10; further comprising a rotational member mounted on the rotor for rotation therewith.

12. A hydraulic dynamic pressure bearing motor according to claim 11; wherein the dimension of each of the thrust clearances is equal to or less than a value obtained by the product of a maximum vertical shift of the rotational member during a non-rotational state of the rotational shaft and a diameter of the first section of the rotational shaft divided by four times a radius of the rotational member.

13. A hydraulic dynamic pressure bearing motor according to claim 12; wherein the rotational member comprises a magnetic disk.

14. A hydraulic dynamic pressure bearing motor according to claim 10; further comprising a plurality of radial dynamic pressure generating grooves and a plurality of thrust dynamic pressure generating grooves formed on the rotational shaft.

15. A hydraulic dynamic pressure bearing motor according to claim 14; wherein the radial dynamic pressure generating grooves are formed on an outer peripheral surface of the first section of the rotational shaft; and wherein the thrust dynamic pressure generating grooves are formed on both of upper and lower radial surfaces of the first section of the rotational shaft.

16. A hydraulic dynamic pressure bearing motor according to claim 14; wherein the radial dynamic pressure generating grooves are formed on an outer peripheral surface of the second section of the rotational shaft; and wherein the thrust dynamic pressure generating grooves are formed on both of upper and lower radial surfaces of the first section of the rotational shaft.

17. A hydraulic dynamic pressure bearing motor according to claim 16; wherein the radial dynamic pressure generating grooves are formed on the an outer peripheral surface of the second portion of the second section of the rotational shaft.

* * * * *